(12) United States Patent
Carbonini et al.

(10) Patent No.: US 9,427,106 B2
(45) Date of Patent: Aug. 30, 2016

(54) MACHINE FOR INFUSION PREPARATION, IN PARTICULAR ESPRESSO COFFEE, SUPPLYING GROUP AND MANUFACTURING METHOD THEREOF

(75) Inventors: Carlo Carbonini, Villastanza di Parabiago (IT); Giancarlo Porzio, Villastanza di Parabiago (IT); Carlo Ferraresi, Villastanza di Parabiago (IT); Walter Franco, Villastanza di Parabiago (IT); Giuseppe Quaglia, Villastanza di Parabiago (IT); Riccardo Oderio, Villastanza di Parabiago (IT)

(73) Assignee: RANCILIO GROUP S.P.A., Villastanza di Parabiago (MI) (IT)

( * ) Notice: Subject to any disclaimer, the term of this patent is extended or adjusted under 35 U.S.C. 154(b) by 0 days.

(21) Appl. No.: 13/262,569

(22) PCT Filed: Mar. 31, 2010

(86) PCT No.: PCT/IB2010/051407
§ 371 (c)(1),
(2), (4) Date: Dec. 6, 2011

(87) PCT Pub. No.: WO2010/113125
PCT Pub. Date: Oct. 7, 2010

(65) Prior Publication Data
US 2012/0090474 A1 Apr. 19, 2012

(30) Foreign Application Priority Data
Apr. 1, 2009 (IT) .............................. TO2009A0250

(51) Int. Cl.
*A47J 31/46* (2006.01)
*A47J 31/56* (2006.01)
(Continued)

(52) U.S. Cl.
CPC .............. *A47J 31/56* (2013.01); *A47J 31/3685* (2013.01); *A47J 31/465* (2013.01); *Y10T 29/49826* (2015.01)

(58) Field of Classification Search
CPC ............... A47J 31/407; A47J 31/3633; A47J 31/3695; A47J 31/0642; A47J 31/3628; A47J 31/002; A47J 31/56; A47J 31/3685; A47J 31/465; Y10T 29/49826
USPC ........ 99/293, 289 R, 295–297, 302 P, 302 R, 99/303; 426/431–434, 594–596; 137/317–319
See application file for complete search history.

(56) References Cited

U.S. PATENT DOCUMENTS 830,771 A * 9/1906 Kelly ............................. 99/298
1,462,322 A * 7/1923 Casoletti ....................... 99/282
(Continued)

FOREIGN PATENT DOCUMENTS

| EP | 0 465 877 A1 | 1/1992 |
| FR | 2 483 762 A1 | 12/1981 |
| FR | 2 907 649 A1 | 5/2008 |

*Primary Examiner* — Eric Stapleton
(74) *Attorney, Agent, or Firm* — Sughrue Mion, PLLC

(57) ABSTRACT

The present invention relates to an infusion machine comprising a boiler having first heating means provided for heating a liquid suitable for infusion preparation, in particular for espresso coffee preparation, at least one supplying group (14), and infusion means (43, 43b) provided for infusion preparation and associated with second heating means (46). The supplying group (14) in the machine further comprises an accumulation chamber (41) hydraulically connected to the infusion means (43, 43b) and arranged to contain a certain amount of liquid. Second heating means (46) are provided, which are arranged to directly heat the liquid contained in the accumulation chamber (41) for hydraulically feeding the infusion means (43). The invention also relates to the supplying group and the method of manufacturing the machine.

11 Claims, 3 Drawing Sheets

(51) Int. Cl.
*B23P 11/00* (2006.01)
*A47J 31/36* (2006.01)

(56) References Cited

U.S. PATENT DOCUMENTS

| | | | | |
|---|---|---|---|---|
| 1,467,171 A * | 9/1923 | Kelly | | 99/283 |
| 1,619,967 A * | 3/1927 | Bontempi | | 99/314 |
| 1,952,733 A * | 3/1934 | Smith | | 426/432 |
| 2,096,848 A * | 10/1937 | Felix | | 99/285 |
| 2,096,849 A * | 10/1937 | Felix | | 99/298 |
| 2,097,681 A * | 11/1937 | Wolcott | | 99/281 |
| 2,107,924 A * | 2/1938 | Adams | | 99/281 |
| 2,119,455 A * | 5/1938 | De Ayala | | 99/280 |
| 2,154,845 A * | 4/1939 | Hegwein | | 99/302 R |
| 2,158,133 A * | 5/1939 | Lemp | | 99/281 |
| 2,190,270 A * | 2/1940 | Peters | | 99/303 |
| 2,192,095 A * | 2/1940 | Myers | | 99/281 |
| 2,199,592 A * | 5/1940 | Holmes | | 99/283 |
| 2,216,738 A * | 10/1940 | Felix | | 99/285 |
| 2,246,061 A * | 6/1941 | Nowland | | 426/435 |
| RE22,022 E * | 2/1942 | Peters | | 99/303 |
| 2,274,607 A * | 2/1942 | Cohen | | 99/292 |
| 2,276,216 A * | 3/1942 | Lehmann | | 219/441 |
| 2,276,540 A * | 3/1942 | Harding | | 99/283 |
| 2,287,583 A * | 6/1942 | Weeks | | 99/281 |
| 2,287,585 A * | 6/1942 | Weeks | | 99/281 |
| 2,385,132 A * | 9/1945 | Graham | | 426/432 |
| 2,388,335 A * | 11/1945 | McCullough | | 99/292 |
| 2,401,529 A * | 6/1946 | Varney et al. | | 99/279 |
| 2,422,580 A * | 6/1947 | Meier | | 219/433 |
| 2,458,640 A * | 1/1949 | Reichold | | 99/281 |
| 2,567,187 A * | 9/1951 | Davis, Jr. | | 99/281 |
| 2,567,188 A * | 9/1951 | Davis, Jr. | | 99/281 |
| 2,610,284 A * | 9/1952 | Kolisch | | 219/441 |
| 2,637,266 A * | 5/1953 | Grado | | 99/293 |
| 2,638,839 A * | 5/1953 | Raiteri | | 99/283 |
| 2,657,299 A * | 10/1953 | McNairy | | 219/441 |
| 2,687,077 A * | 8/1954 | Regina | | 99/313 |
| 2,692,937 A * | 10/1954 | Clark | | 219/436 |
| 2,720,154 A * | 10/1955 | Graham et al. | | 99/312 |
| 2,720,155 A * | 10/1955 | Graham et al. | | 99/312 |
| 2,745,333 A * | 5/1956 | Campbell | | 99/281 |
| 2,745,335 A * | 5/1956 | Hiscock | | 99/295 |
| 2,746,376 A * | 5/1956 | Hiscock | | 99/295 |
| 2,773,166 A * | 12/1956 | Best | | 219/441 |
| 2,798,143 A * | 7/1957 | O'Brien | | 219/441 |
| 2,822,746 A * | 2/1958 | Schwall | | 99/287 |
| 2,868,178 A * | 1/1959 | Peters | | 122/32 |
| 2,878,747 A * | 3/1959 | Cimbali | | 99/302 P |
| 2,887,038 A * | 5/1959 | Rosander | | 99/307 |
| 2,925,027 A * | 2/1960 | Salati | | 99/302 P |
| 3,025,781 A * | 3/1962 | Bossi | | 99/302 C |
| 3,085,495 A * | 4/1963 | Rosander | | 99/283 |
| 3,098,424 A * | 7/1963 | Perucca | | 99/302 R |
| 3,100,434 A * | 8/1963 | Bunn | | 99/282 |
| 3,107,600 A * | 10/1963 | Brun-Buisson | | 99/286 |
| 3,113,503 A * | 12/1963 | Vulliet-Durand | | 99/282 |
| 3,120,439 A * | 2/1964 | Reale | | 426/432 |
| 3,137,227 A * | 6/1964 | Valente | | 99/283 |
| 3,139,344 A * | 6/1964 | Weisman | | 99/295 |
| 3,168,431 A * | 2/1965 | Spielvogel | | 159/37 |
| 3,218,956 A * | 11/1965 | Monticelli | | 99/302 R |
| 3,221,637 A * | 12/1965 | Small et al. | | 99/289 R |
| 3,229,612 A * | 1/1966 | Brown | | 99/282 |
| 3,261,279 A * | 7/1966 | Kaplan et al. | | 99/282 |
| 3,278,087 A * | 10/1966 | Stasse | | 222/146.5 |
| 3,285,158 A * | 11/1966 | Price | | 99/281 |
| 3,286,618 A * | 11/1966 | Barrera | | 99/302 R |
| 3,295,998 A * | 1/1967 | Goros | | 99/282 |
| 3,347,151 A * | 10/1967 | Ronalds | | 99/295 |
| 3,348,468 A * | 10/1967 | Eisendrath | | 99/282 |
| 3,353,474 A * | 11/1967 | MacCorkell | | 99/281 |
| 3,354,810 A * | 11/1967 | Lorang | | 99/282 |
| 3,364,842 A * | 1/1968 | Valente | | 99/298 |
| 3,369,105 A * | 2/1968 | Wheeler | | 219/441 |
| 3,370,523 A * | 2/1968 | Wright | | 99/282 |
| 3,391,632 A * | 7/1968 | Colonna | | 99/279 |
| RE26,463 E | 9/1968 | Carrillo | | 99/293 |
| 3,423,209 A * | 1/1969 | Weber | | 426/433 |
| 3,443,508 A * | 5/1969 | Reynolds et al. | | 99/282 |
| 3,537,383 A * | 11/1970 | Croce | | 99/289 R |
| 3,618,510 A * | 11/1971 | Varney | | A47J 31/043 99/302 R |
| 3,619,561 A * | 11/1971 | Smit | | 392/445 |
| 3,795,788 A * | 3/1974 | Perucca | | 392/484 |
| 3,869,968 A * | 3/1975 | Ihlenfeld | | 99/280 |
| 3,872,781 A * | 3/1975 | Helbling | | 99/282 |
| 3,967,546 A * | 7/1976 | Cailliot | | 99/286 |
| 3,981,231 A * | 9/1976 | Grundy et al. | | 99/280 |
| 4,039,771 A * | 8/1977 | Thorsoe et al. | | 392/480 |
| 4,094,233 A * | 6/1978 | Martin | | 99/305 |
| 4,095,086 A * | 6/1978 | Ohnmacht et al. | | 392/467 |
| 4,137,833 A * | 2/1979 | Yelloz | | 99/293 |
| 4,189,991 A * | 2/1980 | Haddad | | 99/302 R |
| 4,200,039 A * | 4/1980 | Anderl | | 99/302 R |
| 4,204,465 A * | 5/1980 | Knecht | | 99/293 |
| 4,278,013 A * | 7/1981 | Noren et al. | | 99/288 |
| 4,480,173 A * | 10/1984 | Butterfield | | 392/401 |
| 4,484,515 A * | 11/1984 | Illy | | 99/282 |
| 4,565,121 A * | 1/1986 | Ohya et al. | | 99/281 |
| 4,583,449 A * | 4/1986 | Dangel et al. | | 99/279 |
| 4,599,937 A * | 7/1986 | Ghione | | 99/293 |
| 4,603,620 A * | 8/1986 | Daugherty | | 99/300 |
| 4,613,745 A * | 9/1986 | Marotta et al. | | 392/445 |
| 4,641,012 A * | 2/1987 | Roberts | | 392/451 |
| 4,667,584 A * | 5/1987 | Koyama et al. | | 99/280 |
| 4,713,253 A * | 12/1987 | Stone, Jr. | | 426/433 |
| 4,782,744 A * | 11/1988 | Bunn | | 99/307 |
| 4,908,222 A * | 3/1990 | Yu | | 426/241 |
| 4,927,060 A * | 5/1990 | Snowball et al. | | 222/146.5 |
| 4,941,399 A * | 7/1990 | Zucchetti | | 99/289 P |
| 5,014,611 A * | 5/1991 | Illy et al. | | 99/280 |
| 5,115,730 A * | 5/1992 | Gockelmann | | 99/280 |
| 5,186,096 A * | 2/1993 | Willi | | 99/282 |
| 5,255,594 A * | 10/1993 | Grossi | | 99/287 |
| 5,259,279 A * | 11/1993 | Strauch | | 81/436 |
| 5,267,506 A * | 12/1993 | Cai | | 99/280 |
| 5,285,718 A * | 2/1994 | Webster et al. | | 99/290 |
| 5,302,407 A * | 4/1994 | Vetterli | | 426/433 |
| 5,333,537 A * | 8/1994 | Lussi et al. | | 99/287 |
| 5,334,402 A * | 8/1994 | Ovadia | | 426/241 |
| 5,372,061 A * | 12/1994 | Albert et al. | | 99/281 |
| 5,402,705 A * | 4/1995 | Bailleux et al. | | 99/281 |
| 5,404,794 A * | 4/1995 | Patel et al. | | 99/280 |
| 5,406,882 A * | 4/1995 | Shaanan | | 99/287 |
| 5,423,247 A * | 6/1995 | Rodrigues-Ely | | 99/401 |
| 5,551,331 A * | 9/1996 | Pfeifer et al. | | 99/280 |
| 5,747,782 A * | 5/1998 | Orrico et al. | | 219/689 |
| 5,813,318 A * | 9/1998 | Zanin et al. | | 99/291 |
| 5,836,236 A * | 11/1998 | Rolfes et al. | | 99/290 |
| 5,842,407 A * | 12/1998 | Schmed | | 99/290 |
| 5,921,168 A * | 7/1999 | Nello | | 99/295 |
| 5,975,019 A * | 11/1999 | Goss et al. | | 119/173 |
| 5,992,298 A * | 11/1999 | Illy et al. | | 99/281 |
| 6,026,733 A * | 2/2000 | Orrico et al. | | 99/302 R |
| 6,164,191 A * | 12/2000 | Liu et al. | | 99/305 |
| 6,173,117 B1 * | 1/2001 | Clubb | | 392/442 |
| 6,199,472 B1 * | 3/2001 | Greiwe | | 99/291 |
| 6,205,909 B1 * | 3/2001 | Giannelli | | 99/302 P |
| 6,240,831 B1 * | 6/2001 | Rolfes | | 99/285 |
| 6,253,664 B1 * | 7/2001 | Giannelli | | 99/302 P |
| 6,263,780 B1 * | 7/2001 | Rolfes | | 99/307 |
| 6,269,735 B1 * | 8/2001 | Rolfes | | 99/279 |
| 6,279,458 B1 * | 8/2001 | Sham et al. | | 99/281 |
| 6,305,267 B1 * | 10/2001 | Rolfes | | 99/281 |
| 6,578,467 B1 * | 6/2003 | Taylor et al. | | 99/281 |
| 6,659,048 B1 * | 12/2003 | DeSantis et al. | | 122/20 R |
| 6,701,068 B2 * | 3/2004 | Lin | | 392/480 |
| 6,854,381 B2 * | 2/2005 | Fischer | | 99/453 |
| 6,886,451 B2 * | 5/2005 | Donnelly et al. | | 99/281 |
| 6,990,891 B2 * | 1/2006 | Tebo, Jr. | | 99/295 |
| 7,013,795 B2 * | 3/2006 | Mulle et al. | | 99/286 |
| 7,017,472 B2 * | 3/2006 | Grant et al. | | 99/282 |
| 7,024,983 B2 * | 4/2006 | Grant et al. | | 99/281 |

(56) References Cited

U.S. PATENT DOCUMENTS

| | | | |
|---|---|---|---|
| 7,093,530 B2* | 8/2006 | Meister et al. | 99/295 |
| 7,093,533 B2* | 8/2006 | Tebo et al. | 99/315 |
| D534,028 S * | 12/2006 | Artis | D7/326 |
| 7,146,904 B2* | 12/2006 | Scribner | 99/300 |
| 7,210,401 B1* | 5/2007 | Rolfes et al. | 99/289 R |
| 7,213,505 B2* | 5/2007 | Kollep | 99/281 |
| 7,370,375 B2* | 5/2008 | Phillips | 4/493 |
| 7,370,572 B2* | 5/2008 | De'Longhi | 99/302 P |
| 7,654,191 B2* | 2/2010 | Greenwald et al. | 99/275 |
| 7,669,519 B2* | 3/2010 | Pope et al. | 99/315 |
| 7,814,824 B2* | 10/2010 | Beretta | 99/282 |
| 7,918,156 B2* | 4/2011 | Greenwald et al. | 99/275 |
| 8,037,811 B2* | 10/2011 | Bunn | 99/279 |
| 8,096,229 B2* | 1/2012 | Keller | 99/286 |
| 8,225,709 B2* | 7/2012 | Carbonini et al. | 99/289 R |
| 2003/0015099 A1* | 1/2003 | Donnelly et al. | 99/275 |
| 2003/0079612 A1* | 5/2003 | Con | 99/275 |
| 2003/0221563 A1* | 12/2003 | Lee | 99/279 |
| 2004/0065208 A1* | 4/2004 | Hart et al. | 99/275 |
| 2004/0159240 A1* | 8/2004 | Lyall, III | 99/275 |
| 2004/0226452 A1* | 11/2004 | Lyall, III | 99/279 |
| 2004/0261631 A1* | 12/2004 | Lee | 99/433 |
| 2005/0103213 A1* | 5/2005 | Dumm | 99/483 |
| 2005/0139080 A1* | 6/2005 | De'Longhi | 99/275 |
| 2005/0166763 A1* | 8/2005 | Scarchilli et al. | 99/279 |
| 2005/0166765 A1* | 8/2005 | Lyall, III | 99/280 |
| 2005/0204925 A1* | 9/2005 | Orrico et al. | 99/275 |
| 2005/0268790 A1* | 12/2005 | Baldacci | 99/285 |
| 2006/0037482 A1* | 2/2006 | Maver | 99/288 |
| 2006/0219098 A1* | 10/2006 | Mandralis et al. | 99/279 |
| 2006/0278092 A1* | 12/2006 | Lyall, III | 99/279 |
| 2007/0151466 A1* | 7/2007 | Clark et al. | 99/467 |
| 2007/0169635 A1* | 7/2007 | Bienvenu et al. | 99/279 |
| 2007/0199453 A1* | 8/2007 | Rasmussen et al. | 99/279 |
| 2007/0221066 A1* | 9/2007 | Sullivan et al. | 99/279 |
| 2007/0248728 A1* | 10/2007 | Navarini et al. | 426/433 |
| 2007/0259074 A1* | 11/2007 | Searchilli et al. | 426/78 |
| 2007/0272084 A1* | 11/2007 | Mandralis et al. | 99/275 |
| 2007/0277676 A1* | 12/2007 | Crivellin | 99/288 |
| 2007/0283815 A1* | 12/2007 | O'Connor et al. | 99/279 |
| 2007/0283816 A1* | 12/2007 | O'Connor et al. | 99/282 |
| 2008/0003337 A1* | 1/2008 | Rasmussen et al. | 426/433 |
| 2008/0017041 A1* | 1/2008 | Beretta | 99/279 |
| 2008/0028945 A1* | 2/2008 | Almond | 99/287 |
| 2008/0041233 A1* | 2/2008 | Bunn | 99/281 |
| 2008/0092746 A1* | 4/2008 | Clark et al. | 99/281 |
| 2008/0095904 A1* | 4/2008 | Sullivan et al. | 426/431 |
| 2008/0115674 A1* | 5/2008 | Huang et al. | 99/279 |
| 2008/0134902 A1* | 6/2008 | Zimmerman et al. | 99/302 R |
| 2008/0163765 A1* | 7/2008 | O'Shea | 99/482 |
| 2008/0168905 A1* | 7/2008 | Hart | 99/280 |
| 2008/0190298 A1* | 8/2008 | Morgandi | 99/282 |
| 2008/0216663 A1* | 9/2008 | Williamson | 99/279 |
| 2008/0250935 A1* | 10/2008 | Van Belleghem | 99/289 R |
| 2008/0260928 A1* | 10/2008 | MacMahon et al. | 426/588 |
| 2008/0264264 A1* | 10/2008 | Morgandi | 99/281 |
| 2008/0264266 A1* | 10/2008 | Carbonini et al. | 99/289 R |
| 2008/0264268 A1* | 10/2008 | Tjen | 99/323 |
| 2008/0271608 A1* | 11/2008 | Morin | 99/294 |
| 2009/0007792 A1* | 1/2009 | Glucksman et al. | 99/282 |
| 2009/0120299 A1* | 5/2009 | Rahn et al. | 99/279 |
| 2009/0136639 A1* | 5/2009 | Doglioni Majer | 426/431 |
| 2009/0223376 A1* | 9/2009 | Navarini et al. | 99/293 |
| 2009/0232944 A1* | 9/2009 | Macmahon et al. | 426/78 |
| 2009/0263550 A1* | 10/2009 | Navarini et al. | 426/506 |
| 2009/0293733 A1* | 12/2009 | Martin et al. | 99/280 |
| 2009/0304887 A1* | 12/2009 | Arai | 426/498 |
| 2009/0308255 A1* | 12/2009 | Coccia et al. | 99/281 |

* cited by examiner

MACHINE FOR INFUSION PREPARATION, IN PARTICULAR ESPRESSO COFFEE, SUPPLYING GROUP AND MANUFACTURING METHOD THEREOF

CROSS REFERENCE TO RELATED APPLICATIONS

This application is a National Stage of International Application No. PCT/IB2010/051407, filed on Mar. 31, 2010, which claims priority from Italian Patent Application No. TO2009A000250, filed Apr. 1, 2009, the contents of all of which are incorporated herein by reference in their entirety.

TECHNICAL FIELD

The present invention generally relates to a machine for preparing coffee or barley infusions. In particular, the present invention relates to a machine for preparing espresso coffee or similar infusions, which is equipped with several stages for heating the water or the liquid necessary for infusion preparation.

PRIOR ART

Machine for preparing infusions, such as machines for preparing espresso coffee, to which reference is made hereinafter for sake of easiness of description, are well known.

Such machines generally comprise a boiler and a supplying unit or infusion chamber for supplying espresso coffee, for instance into a coffee cup.

More particularly, espresso coffee machines including several stages for heating the water necessary for preparing coffee are known.

For instance, an espresso coffee machine known from publication EP_0465877_A1 in the name of the Applicant includes a boiler as a first heating stage for bringing the water temperature to values in the range 95 to 98° C., and a heating element as a second heating stage, which is housed within a housing also including the infusion chamber and is arranged to maintain the infusion chamber at a thermostatically-controlled temperature.

A similar machine is also known from publication U.S. Pat. No. 5,551,331 in which, in particular, it is envisaged that the second stage is arranged to increase the infusion chamber temperature when a temperature sensor detects that the temperature of the chamber has fallen below a predetermined value.

A problem common to the whole prior art is that the second heating stage, as it is envisaged, does not allow finely optimising the coffee preparation temperature due to thermal inertia phenomena, which are typical when a housing comprising the infusion chamber is heated by means of a heating device.

The Applicant has realised that, generally, none of the existing espresso coffee machines including at least two heating stages is capable of ensuring an actual control, at any instant, of the coffee supply temperature.

The Applicant has further realised that none of the prior art machines is capable of fully optimising the electric power necessary for its operation, for reasons of dimensioning and configuration of the internal parts.

DESCRIPTION OF THE INVENTION

It is therefore a first object of the present invention to solve the problems mentioned above of the prior art, in particular the problem of controlling at any instant the coffee supply temperature.

It is another object of the present invention, related with the first one, to manufacture a machine for preparing coffee, which allows reducing the overall electric power necessary for its operation thanks to the provision of several independently controllable and suitably sized heating stages.

The objects are achieved by the machine for infusion preparation, in particular for to espresso coffee preparation, as claimed herein.

The present invention also concerns a supplying group for machines for infusion preparation, as well as a method of manufacturing a machine for infusion preparation.

The claims are integral part of the technical teaching provided herein in respect of the invention.

In accordance with a preferred embodiment, the infusion machine comprises, besides a boiler for heating a liquid necessary for infusion preparation, at least one supplying group comprising infusion means and an accumulation chamber associated with the infusion means and arranged to directly heat the liquid to the infusion temperature and to hydraulically feed the infusion means.

In accordance with another feature of the present invention, the infusion means include an infusion duct connected to the accumulation chamber or, in the alternative, an infusion chamber connected to that duct.

In accordance with a further feature of the present invention, the accumulation chamber internally contains the infusion chamber.

In accordance with another feature of the present invention, the accumulation chamber contains an amount of liquid substantially equal to that required for infusion preparation.

In accordance with yet another feature of the present invention, the accumulation chamber comprises means for heating the liquid, which are so dimensioned that they dynamically control, during the infusion step, the infusion temperature within a predetermined range.

BRIEF DESCRIPTION OF THE FIGURES

The above and other features and advantages of the present invention will become apparent from the following description of a preferred embodiment, made by way of non limiting example with reference to the accompanying drawings, in which elements denoted by a same or similar numerical reference correspond to components having the same or similar function and construction, and in which.

DESCRIPTION OF A PREFERRED EMBODIMENT

Figure 1:
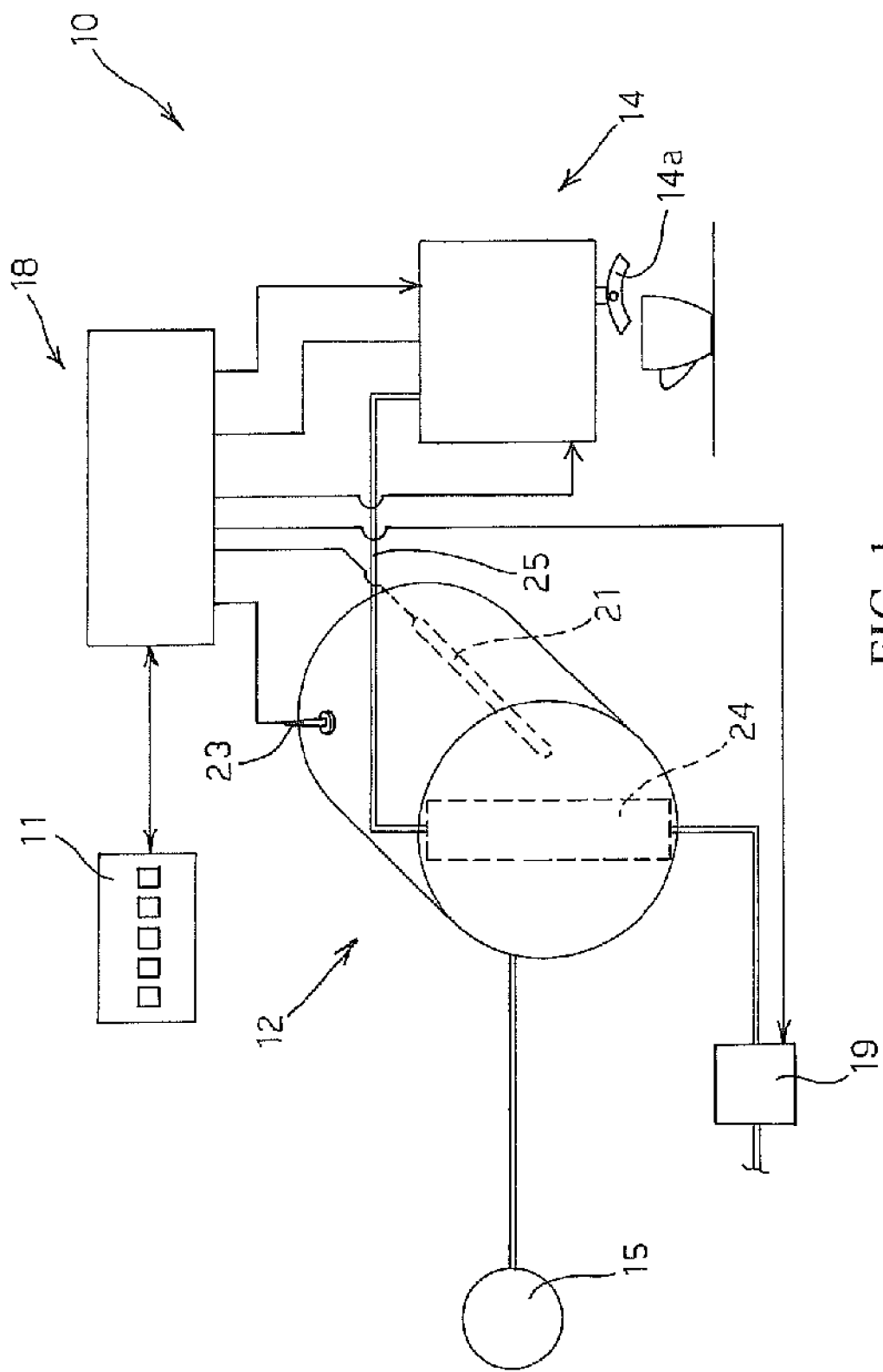
FIG. 1 is a general diagram of an espresso coffee machine according to the invention.
Figure 2:
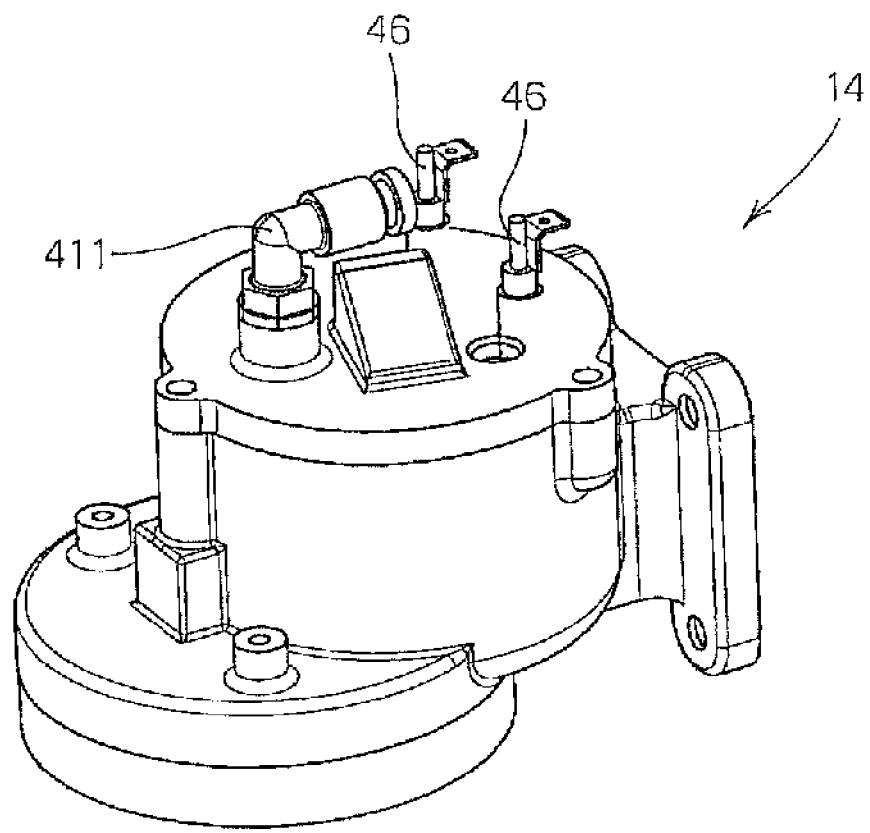
FIG. 2 is a schematic perspective view of a supplying group of the machine shown in FIG. 1.

Referring to FIG. 1, an espresso coffee machine 10 according to the present exemplary embodiment comprises a boiler 12, one or more supplying groups 14 that can be associated with filter holders containing, in use, coffee powder (coffee bricks) and equipped with respective spouts 14a, and that are arranged to allow preparing espresso coffee, and one or more devices 15 for the provision of so-called services (service provision devices), such as er for instance devices for providing hot water or steam services.

Machine 10 further includes at least one user device or keyboard 11, arranged to control the coffee supply and the service provision, and a control unit 18 configured for controlling the operation of boiler 12, supplying groups 14 and service provision devices 15, as it will be disclosed in detail below.

In the preferred embodiment, boiler 12, of known type, includes a heating unit 21 controlled in known manner by control unit 18 through a sensor 23, for instance a temperature sensor, and it is arranged for instance to directly feed service provision devices 15 with hot water or steam.

Boiler 12 is preferably fed, in known manner, with water from the mains, which generally has a temperature in the range 5 to 25° C.

In the preferred embodiment, boiler 12 also includes a heat exchanger 24 hydraulically fed by means of a pump 19, for instance a positive displacement pump. The heat exchanger is so dimensioned that it preferably contains an amount of water or liquid from 300 to 400 cc at predetermined temperature and pressure.

More preferably, heat exchanger 24 is so dimensioned that, in case of a machine with four supplying groups, it contains an amount of water of about 350 cc. In heat exchanger 24, in case of supply from heat exchanger 24 to supplying group 14, water leaves heat exchanger 24 at a temperature, for instance, in the range 80 to 85° C.

Heat exchanger 24 is connected with supplying groups 14 by means of a duct 25 of known type, for instance a thermally insulated duct made of copper. Only one group 14 is shown and disclosed hereinafter, since in the preferred embodiment such groups are identical to each other.

Supplying group 14 includes, in the preferred embodiment, an accumulation chamber 41 (FIG. 1, FIG. 2, FIGS. 3A and 3B), arranged to internally contain water to be used for coffee preparation, and an infusion chamber 43, arranged to be fed by accumulation chamber 41, when coffee preparation is required, for supplying espresso coffee into a coffee cup through a duct 43b. In such an embodiment, infusion chamber 43 forms infusion means for infusion preparation.

In accordance with other embodiments, the infusion chamber can be missing and to can be replaced by duct 43b arranged so as to be included in supplying group 14 and to form the infusion means for infusion preparation under the control of an electrically operated valve of known type.

In case infusion chamber 43 is provided, it is preferably contained within accumulation chamber 41 and operates in known manner under the control of an electrically operated valve 48 of known type.

More preferably, accumulation chamber 41 and infusion chamber 43 form a supplying group 14 in which infusion chamber 43 is concentric with accumulation chamber 41 or is integrated into accumulation chamber 41.

The latter embodiments, which are deemed preferable, provide for infusion chamber 43 being filled with supply water during the process of preparing the coffee beverage.

This allows obtaining a progressive infusion through the application of an increasing pressure onto the coffee brick.

In fact, the increasing pressure is originated because supply water needs a certain time in order to fill the infusion chamber and hence, during such a time, causes a slow pressure increase in the infusion chamber.

Preferably, the pressure increases up to a value corresponding to the maximum value generated by pump 15, for instance 9 bars.

The supply manner based on the provision of an infusion chamber is thus preferable since it allows a better exploitation of the organoleptic properties of the coffee and, on the other hand, the provision of an infusion chamber 43 inside or concentric with accumulation chamber 41 allows achieving the object of optimising the energetic efficiency in water circulation between the accumulation chamber and the infusion chamber and of continuously controlling the temperature of water arriving at the coffee brick.

Accumulation chamber 41 includes a temperature probe or sensor 45 and a heating element 46 of predetermined power, both connected in known manner to control unit 18.

The heating element is generally arranged to bring water temperature to optimum values for espresso coffee preparation, e.g. values in the range 88 to 95° C.

Figure 3A:
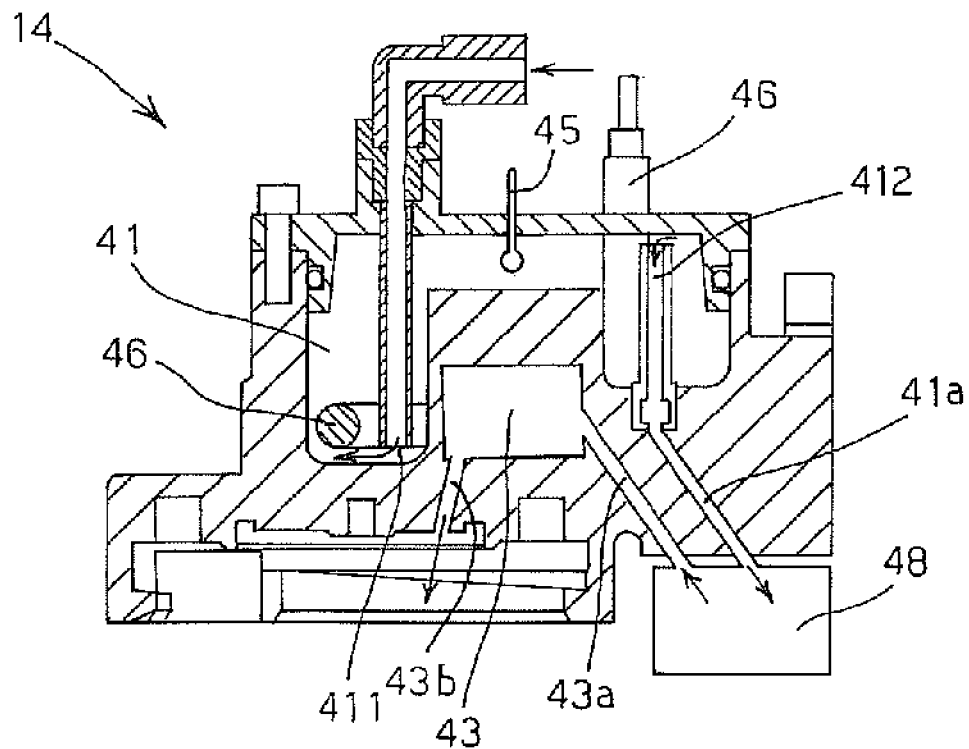
FIGS. 3A and 3B are schematic sectional views of the supplying group shown in FIG. 2.
Figure 3B:
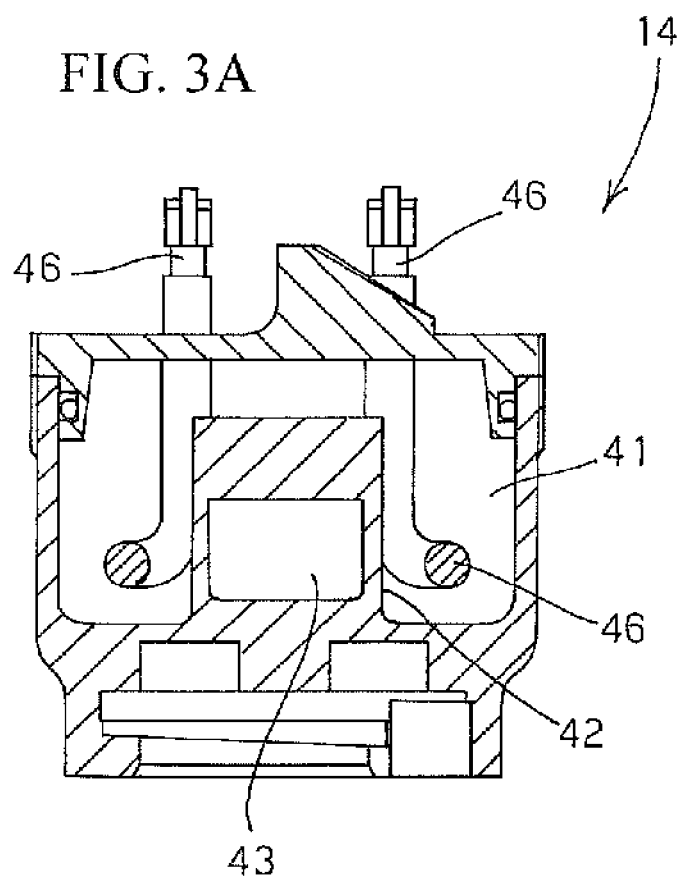

Preferably, heating element 46 is arranged so as to be distributed inside the entire accumulation chamber 41 or a part of it. For instance, as shown in FIG. 3B, the heating element 46 can be shaped as a semi-closed ring.

Preferably, accumulation chamber 41 has an internal volume which is limited with respect to the power that can be delivered by heating element (resistor) 46, thereby allowing controlling the water temperature at any instant.

In the preferred embodiment, accumulation chamber 41 is connected to the infusion chamber, in known manner, by means of an outlet duct 41a from chamber 41, electrically operated valve 48 and an inlet duct 43a for infusion chamber 43.

In accordance with other embodiments in which the infusion chamber is missing, duct 43b forming the infusion means is directly connected with duct 43a and hence to electrically operated valve 48, like in the preferred embodiment.

In all cases, accumulation chamber 41 preferably has an inlet 411 for water coming from the heat exchanger located at the bottom of chamber 41, and an outlet 412 connected to outlet duct 41a and located at the top of chamber 41, preferably in a diametrically opposite position with respect to inlet 411.

As a skilled in the art can readily understand, such a configuration, which is the preferred configuration, allows avoiding the presence of air at the top of the accumulation chamber, where outlet 412 is provided, and maximising water mixing during supply in order to maintain a homogeneous temperature, at any instant, in accumulation chamber 41.

In the preferred embodiment, accumulation chamber 41 is connected to the infusion chamber, in known manner, by means of an outlet duct 41a from chamber 41, electrically operated valve 48 and an inlet duct 43a for infusion chamber 43.

Such a configuration, which is the preferable configuration, allows minimising temperature variations between water contained in the accumulation chamber and water supplied during coffee preparation, since water maintains internal wall 42, i.e. the wall common to the accumulation chamber and the infusion chamber, at the temperature determined by resistor 46 controlled by control unit 18.

By using configurations of supplying group 14 as described above and by providing, for instance, that accumulation chamber 41 has a capacity equal to that required for preparing two cups of coffee (about 100 cc), and resistor 46 has a power of 200 W, the Applicant has experimentally detected that it is possible to control temperature variations, both up and down, of at least 1° C. every 5 sec of espresso coffee supply.

For instance, considering that, as known to the skilled in the art, the average time for supplying a cup of espresso coffee is about 25 to 30 sec and that heating element 46 has anyway an inertia to heating, even if very low, the Applicant has experimentally detected that the arrangement of supplying group 14 as described allows dynamically controlling, during coffee supply, temperature fluctuations or variations within a temperature range of ±4 to 5 degrees.

Such temperature fluctuations can be controlled by means of control unit 18 and resistor 46 connected thereto, by setting and storing suitable parameters into the same unit 18 and by associating one or more keys of keyboard 11 with such parameters, thereby making different supply characteristics for espresso coffee or a particular infusion kind available.

The Applicant has also noticed that the overall machine configuration described above, in which a heat exchanger 24 in boiler 12 and supplying groups 14 independent from each other and equipped with respective or corresponding accumulation chambers 41 are provided, allows reducing the overall electric power necessary for the operation of machine 10 with respect to the power generally required in machines having a single heating stage located within the boiler.

Actually, the prior art machines having a single heating stage need a power of about 700 W for supplying a pair of cups of espresso coffee from a supplying group, whereas machine 10 according to the present invention substantially needs, for supplying a pair of cups of espresso coffee from a supplying group, the power supplied by heating element 46, hence about 200 W.

The Applicant has further noticed that, advantageously, each supplying group 14, being independent of the other supplying groups possibly present in machine 10, can be kept on or off depending on the amount of activity required, without thereby affecting the activity of service provision devices 15 or the other supplying groups.

The operation of machine 10 according to the invention is as follows.

In idle conditions of machine 10, supplying groups 14 are kept off or in low consumption (standby) condition, at a constant temperature close to the optimum values for espresso coffee preparation, for instance 88° C. at predetermined pressure.

In conditions of coffee supply by at least one supplying group 14, upon actuation e.g. of a suitable key on keyboard 11, control unit 18, based upon the program modules stored therein for instance during the machine design phase, activates, if necessary, heating element 46 of accumulation chamber 41 associated with infusion chamber 43 from which espresso coffee is to be supplied and, once the starting supply temperature has been achieved, operates electrically operated valve 48 so that water passes from accumulation chamber 41 to infusion chamber 43 and hence into the coffee cup.

Of course, the starting temperature of accumulation chamber 41 can be that necessary for infusion preparation, as provided for instance in standby conditions, so that the actuation of the proper key can result in the immediate operation of electrically operated valve 48.

During supply, control unit 18, based on the programs stored therein, will control the water temperature, if this is provided for, by varying it within a predetermined range in order to obtain espresso coffee with characteristics depending on the programming of control unit 18.

In summary, thanks to the provision of an accumulation chamber 41, in correspondence of each infusion chamber 43, it is possible to control the water supply temperature and consequently the characteristics of the espresso coffee in terms of taste and quality.

Of course, obvious changes and/or modifications to the above description in respect of shapes, materials, components and connections, as well as in respect of the details of the illustrated construction and the operating manner are possible without departing from the scope of the invention as set forth in the following claims.

The invention claimed is:

1. An espresso coffee machine comprising in a body:
    a boiler comprising a boiler heating element provided for heating in the boiler a liquid arranged for infusion preparation;
    at least one supplying group connected to the boiler comprising:
        a first chamber directly connected to the boiler by a first duct and arranged to accumulate a certain amount of the liquid coming from the boiler through the first duct;
        a second chamber internal to the first chamber and hydraulically connected to the first chamber by an outlet duct exiting from the first chamber and an inlet duct entering the second chamber;
        wherein the first chamber comprises a first chamber heating element distributed inside the entire first chamber or inside a portion of the first chamber and arranged to directly heat the liquid contained in the first chamber to an infusion temperature for espresso coffee preparation;
        wherein the second chamber is provided for being filled with liquid hydraulically received from the first chamber by way of the outlet duct and the inlet duct and heated by the first chamber heating element, the second chamber connected by a second duct to an external filter holder for infusion preparation; and
    wherein a valve is provided between the outlet duct and the inlet duct, the valve being arranged for delivering the liquid heated by the first chamber heating element from the first chamber to the second chamber and to the second duct for infusion preparation at the infusion temperature for espresso coffee preparation.

2. The machine according to claim 1, wherein the first chamber is sized to contain an amount of liquid lower than the amount of liquid contained in the boiler and sufficient for an infusion preparation.

3. The machine according to claim 1, comprising:
    a control unit connected to the first chamber heating element and arranged to dynamically control, by the first chamber heating element, the infusion temperature during infusion preparation.

4. The machine according to claim 2, comprising:
    a control unit connected to the first chamber heating element and arranged to dynamically control, by the first chamber heating element, the infusion temperature during infusion preparation.

5. The machine according to claim 1, wherein the accumulation chamber receives liquid from the boiler at an inlet located at a lower part of the first chamber and hydraulically feeds liquid to the second chamber via an outlet located at an upper part of the first chamber above the lower part.

6. A supplying group for an espresso coffee machine, comprising:
    a first chamber arranged to contain a certain amount of liquid and connected to a boiler; and
    a second chamber arranged inside the first chamber and hydraulically connected to the first chamber by an outlet duct of the first chamber and an inlet duct of the second chamber,
    wherein the first chamber comprises a first chamber heating element distributed inside the entire first chamber or inside a portion of the first chamber and arranged to directly heat the liquid contained in the first chamber to an infusion temperature for espresso coffee preparation, wherein the second chamber is provided for being filled with liquid hydraulically received from the first chamber by the outlet duct and the inlet duct and heated by the first chamber heating element, the second chamber being connected by a second outlet duct to an external filter holder for infusion preparation, and wherein a valve is provided between the outlet duct and the inlet duct, the valve being arranged to deliver the liquid, heated by the first chamber heating element, from the first chamber to the second chamber and to the second outlet duct for infusion preparation at the infusion temperature for espresso coffee preparation.

7. The group according to claim 6, wherein the second chamber is concentric to the first chamber.

8. An espresso coffee machine for preparing espresso coffee, comprising in a body:
a first heating unit that heats a liquid;
at least one supplying group connected through a first duct to the first heating unit, the at least one supplying group comprising:
an accumulation chamber with an inlet for receiving through the first duct the liquid heated by the first heating unit;
a second heating unit contained within the accumulation chamber;
an internal chamber hydraulically connected to the accumulation chamber and arranged to be fed by the accumulation chamber with supply water by an outlet duct exiting from the accumulation chamber and an inlet duct entering the internal chamber during the process of preparing an espresso coffee beverage;

wherein the internal chamber is contained within the accumulation chamber;

wherein the second heating unit is distributed inside the entire accumulation chamber or inside a portion of the accumulation chamber and is arranged to heat the supply water to an infusion temperature optimized for espresso coffee preparation, wherein a valve is provided between the outlet duct and the inlet duct, the valve being arranged for delivering the liquid, heated by the second heating unit, from the accumulation chamber to the internal chamber for infusion preparation at the infusion temperature optimized for espresso coffee preparation; and wherein the at least one supplying group is associated with a respective filter holder containing, in use, coffee powder and equipped with respective spouts, whereby the internal chamber is configured to supply the hot liquid to the filter holder through a second outlet duct for preparing espresso coffee at the infusion temperature optimized for espresso coffee preparation.

9. The espresso coffee machine according to claim 8, comprising a pump sufficient to supply about 9 bars of liquid pressure to the accumulation chamber of the at least one supplying group through the first duct.

10. The espresso coffee machine according to claim 8, wherein the internal chamber is concentric with the accumulation chamber.

11. The espresso coffee machine according to claim 8, wherein the accumulation chamber receives liquid from the first heating unit at an inlet located at the bottom of the accumulation chamber and hydraulically feeds liquid to the internal chamber through an outlet located at the top of the accumulation chamber.

\* \* \* \* \*